March 29, 1949.　　　　B. P. TOTH　　　　2,465,558

ROTATABLE STOP FOR METAL WORKING MACHINES

Filed April 20, 1945

INVENTOR.
Barnabas P. Toth
BY
Wooster & Davis Attys.

Patented Mar. 29, 1949

2,465,558

UNITED STATES PATENT OFFICE 2,465,558

ROTATABLE STOP FOR METAL-WORKING MACHINES

Barnabas P. Toth, Bridgeport, Conn., assignor to Barnaby Manufacturing and Tool Company, Bridgeport, Conn., a partnership Application April 20, 1945, Serial No. 589,318

1 Claim. (Cl. 29—57)

This invention relates to a rotatable stop for metal working machines, such, for example, as automatic lathes, automatic screw machines, and the like, and more particularly to a stop against which the bar of stock is fed in the feeding operation to limit the feeding movement of the stock and determine the amount of feed, and has for an object to provide an improved and simplified construction of such a stop in which the stop member is rotatable to prevent wear from the end of the stock bar and to maintain a more accurate position, and in which the rotatable stop member is effectively locked in position, but may be readily removed if desired for grinding, renewal or repair.

With the foregoing and other objects in view, I have devised the construction illustrated in the accompanying drawing forming a part of this specification. It is, however, to be understood the device is not limited to the specific details of construction and arrangement shown, but may embody various changes and modifications within the scope of the invention.

Figure 1:
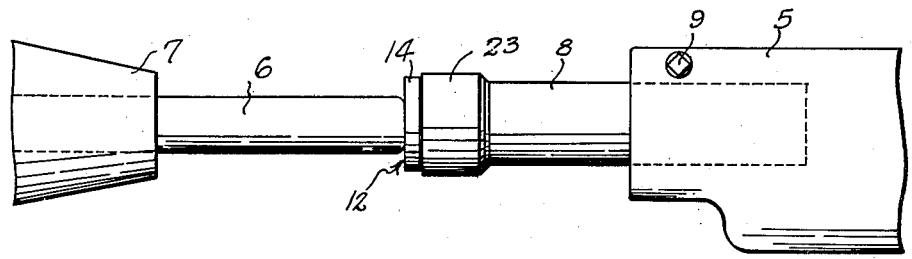
Fig. 1 is a somewhat diagrammatical side elevation showing the stop in operation.

In Fig. 1 the stop is shown as mounted in the rotatable turret or other tool support 5 of an automatic lathe or other metal working machine, against which a bar of stock 6 may be fed forwardly by suitable feed mechanism, not shown, to determine the amount of stock to be fed into working position, and then gripped by any suitable chuck 7 to be held and rotated during the cutting or other working operations on the bar by suitable tools, not shown. My improved stop comprises a shank 8 adapted to be inserted in a socket or other holding means in the support or holder 5 and clamped therein by any suitable means such as a clamp screw 9. This shank is provided with a socket 10 extending longitudinally inward from its outer end, and the shank may or may not be somewhat enlarged at its outer end portion, as shown at 11. Mounted within the socket is a rotatable stop member 12 including a stem 13 and preferably a somewhat enlarged head 14, although not necessarily so, the stem being mounted in the socket 10 with suitable bearings to permit rotation of the stop member 12 and also locate it in proper position so that its outer end acts as a limit stop for feeding movements of the stock bar 6.

Figure 2:
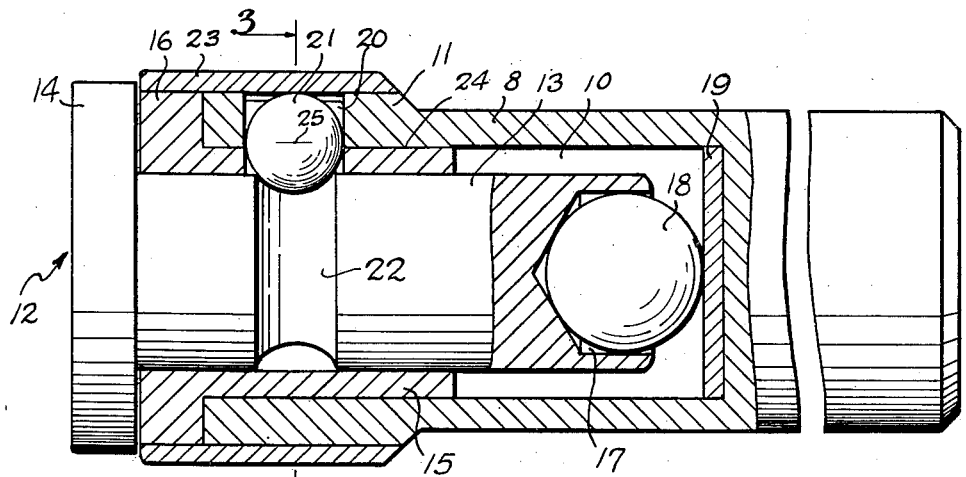
Fig. 2 is a partial side elevation and partial longitudinal section of the improved stop.
Figure 3:
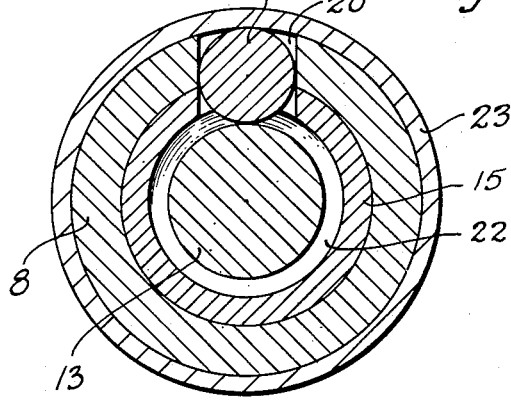
Fig. 3 is a transverse section substantially on line 3—3 of Fig. 2.

Preferably there is a bearing bushing 15 mounted in the outer portion of the socket 10, although the socket 10 may itself form the bearing for the stem 13. This bearing bushing 15 is preferably of bronze or similar bearing material, and has an enlarged head 16 resting against the outer end of the shank 8. At its inner end the shank 13 is provided with a socket 17 to receive a steel ball 18 forming a thrust bearing for the rotatable stop member 12. This may rest directly against the inner end of the socket 10, but preferably a hardened steel block or plate 19 is mounted at the inner end of the socket against which the ball thrust bearing 18 rests. It is preferred that this bearing member 19 and the ball 18 be so located and the stem 13 be of such length that the head 14 of the rotatable member is spaced a short distance from the outer end of the bushing 15, as shown in Fig. 2, for clearance, and to permit free rotation of the member 12.

Improved means is provided for locking or retaining the rotary stop member 12 in the shank. For this a transverse or radially extending opening 20 is drilled through the side wall of the shank 8 and bushing 15 to receive a retaining member 21, which is preferably a steel ball, although it could be of other form, and the stem 13 is provided with a coacting peripheral shoulder, preferably in the form of a groove 22 in alignment with the opening 20 to receive and substantially fit the inner portion of the retaining member or ball 21, so that the inner portion of the retaining member projects into the groove 22 to retain the rotatable member 12 in the socket. It also acts to retain the bushing 15 in the socket.

The ball 21 is retained in position in the side opening 20 by means of a sleeve 23 embracing the shank 8 and slidable longitudinally thereon so that it may be shifted to a position to cover the outer end of the opening 20. This sleeve has a rather tight sliding fit on the shank 8 so that it normally retains its position but may be shifted longitudinally on the shank to and from its position over the opening 20. In assembling, after the bushing 15 and rotatable member 12 are mounted in position, the retaining member or ball 21 is inserted in position in the opening 20, and then the sleeve 23 is slid into position over this opening to retain the ball in position.

There is a coacting camming action between the wall of groove 22 and the retaining member 21, so that a pull on the rotatable member 12 tending to pull it outwardly will force the retaining member or ball 21 outwardly and press it against the sleeve 23 and thus clamp this sleeve in position and preventing its moving out of position. It is also preferred that the ball 21 and the bushing 16 be so proportioned that the line 24 indicating the outer diameter of the bushing be inward somewhat from the center 25 of the ball, so that any tendency of the bushing 15 to move outwardly would also have a camming action on the ball 21 and tend to force it outwardly against the sleeve 23 to clamp it in position. The cavities 17 and 10 may be packed with grease for proper lubrication.

It will be apparent from the above that this provides a very simple mounting for the rotatable stop member 12, and as a greater part of the thrust on this member is longitudinal this will be taken by the antifriction thrust bearing 18. However, the rotatable member is effectively locked in position within the shank by the coaction of the retaining member and the groove 22 without interfering with free rotation of the stop member 12, and any longitudinal pull or force on the rotatable member automatically clamps the retaining sleeve 23 in position, which in turn holds the retaining member 21 in proper position. However, if desired, the locking or retaining member 21 and the rotatable member 12 may be removed from the shank by merely first sliding the sleeve 23 longitudinally on the shank from its position over the opening 20 to release the locking or retaining member 21. This makes a very simple and effective construction for mounting a rotary or live stop, and one which will remain accurate during unlimited operation.

Having thus set forth the nature of my invention, what I claim is:

A stop of the character described comprising a shank adapted to be gripped in a support and provided with a socket extending longitudinally inward from one end, a rotatable stop member provided with a stem projecting into the socket, said stem being provided with a socket in its inner end, a ball mounted in said latter socket forming a thrust bearing for the stem, a bearing bushing embracing the stem and mounted in the outer portion of the socket in the shank, said shank and bushing being provided with aligned openings through their side walls, a ball in said openings to lock the bushing in the shank, a sleeve slidable on the shank to a position over the opening to retain the ball therein and having a sufficiently tight fit on the shank to normally retain it in this position, and said stem being provided with a peripheral groove in which the second ball extends to retain the rotatable member in the shank and adapted by a camming action from a longitudinal pull on the rotatable member to force the ball outwardly against the sleeve to clamp it in position over the opening during said pull, the second ball being of a diameter substantially equal to the distance from the bottom of the groove to the inner surface of the sleeve.

BARNABAS P. TOTH.

REFERENCES CITED

The following references are of record in the file of this patent:

UNITED STATES PATENTS

| Number | Name | Date |
|---|---|---|
| 692,988 | Davis | Feb. 11, 1902 |
| 1,467,304 | Bosshard | Sept. 11, 1923 |
| 1,524,778 | Brown | Feb. 3, 1925 |
| 1,732,706 | Wiles | Oct. 22, 1929 |
| 1,758,717 | Gordon | May 13, 1930 |